(12) United States Patent
Chu et al.

(10) Patent No.: US 7,994,728 B2
(45) Date of Patent: Aug. 9, 2011

(54) BOOST DRIVER CIRCUIT WITH FAST DISCHARGING FUNCTION

(75) Inventors: Kwan-Jen Chu, Hsinchu (TW); Nien-Hui Kung, HsinChu (TW); Tzu-Huan Chiu, Chupei (TW); Chien-Ping Lu, Tainan (TW)

(73) Assignee: Richtek Technology Corporation, Hsin-chu (TW)

( * ) Notice: Subject to any disclaimer, the term of this patent is extended or adjusted under 35 U.S.C. 154(b) by 372 days.

(21) Appl. No.: 12/384,154

(22) Filed: Apr. 1, 2009

(65) Prior Publication Data
US 2010/0072915 A1    Mar. 25, 2010

(30) Foreign Application Priority Data
Sep. 24, 2008   (TW) .............................. 97136751 A

(51) Int. Cl.
*H05B 37/00*    (2006.01)

(52) U.S. Cl. ......... 315/224; 315/193; 315/307; 315/308

(58) Field of Classification Search .................. 315/224, 315/307, 308, 185 R, 193, 186, 209 R, 306, 315/323
See application file for complete search history.

(56) References Cited

U.S. PATENT DOCUMENTS

| 6,864,641 B2 * | 3/2005 | Dygert ........................ 315/216 |
| 7,423,389 B2 * | 9/2008 | Lee ............................. 315/308 |
| 7,609,237 B2 * | 10/2009 | Ragonesi et al. ............. 345/82 |

* cited by examiner

*Primary Examiner* — David Hung Vu
(74) *Attorney, Agent, or Firm* — Tung & Associates

(57) ABSTRACT

The present invention discloses a boost driver circuit which converts an input voltage to an output voltage and supplies it to a load, the boost driver circuit comprising: a power transistor electrically connected with a node between the input voltage and the output voltage; a pulse width modulation driver circuit for controlling the operation of the power transistor; an output node electrically connected with the output voltage; a feedback node electrically connected with the load; a low voltage transistor electrically connected with the feedback node; and a clamp and fast discharge circuit electrically connected with the feedback node for discharging the feedback node when the voltage at the feedback node is higher than a predetermined voltage.

9 Claims, 3 Drawing Sheets

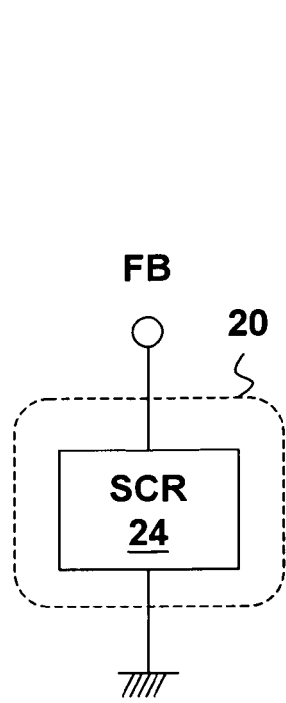
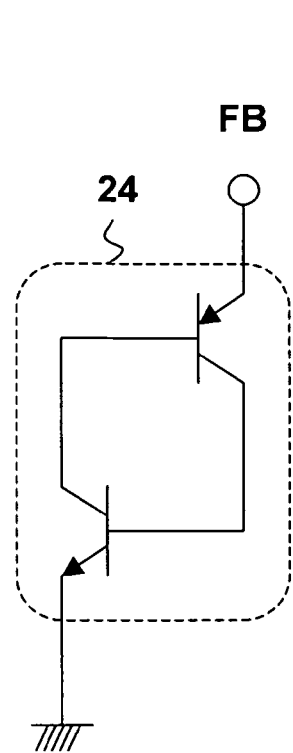
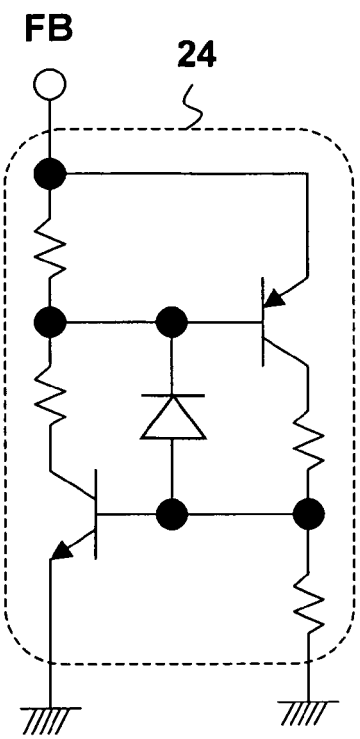
Fig. 3    Fig. 4    Fig. 5
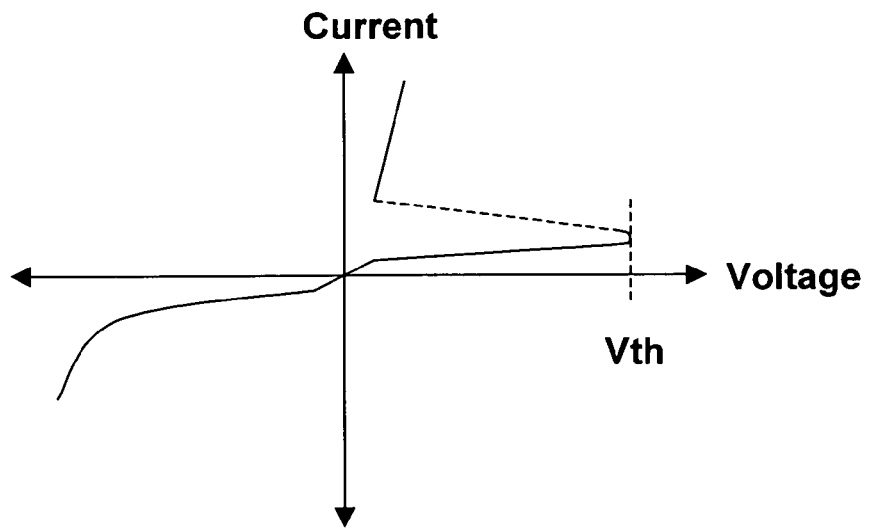
Fig. 6

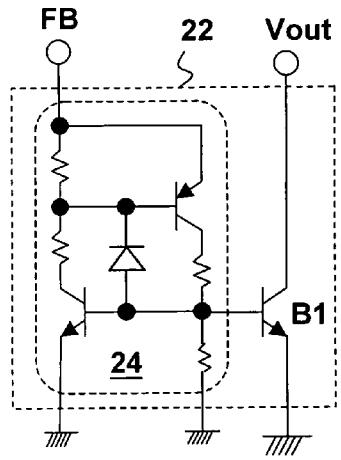
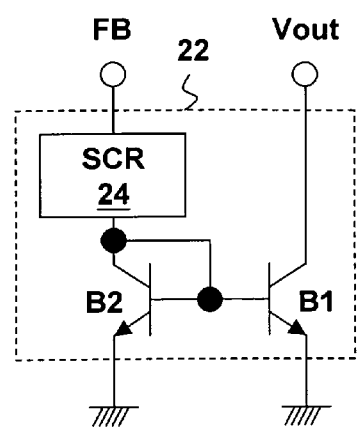
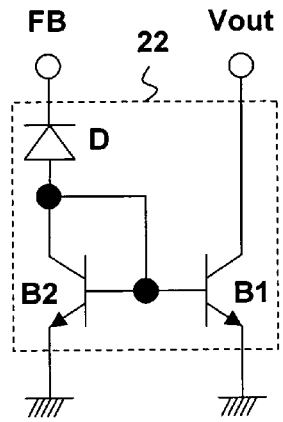
Fig. 7   Fig. 8   Fig. 9
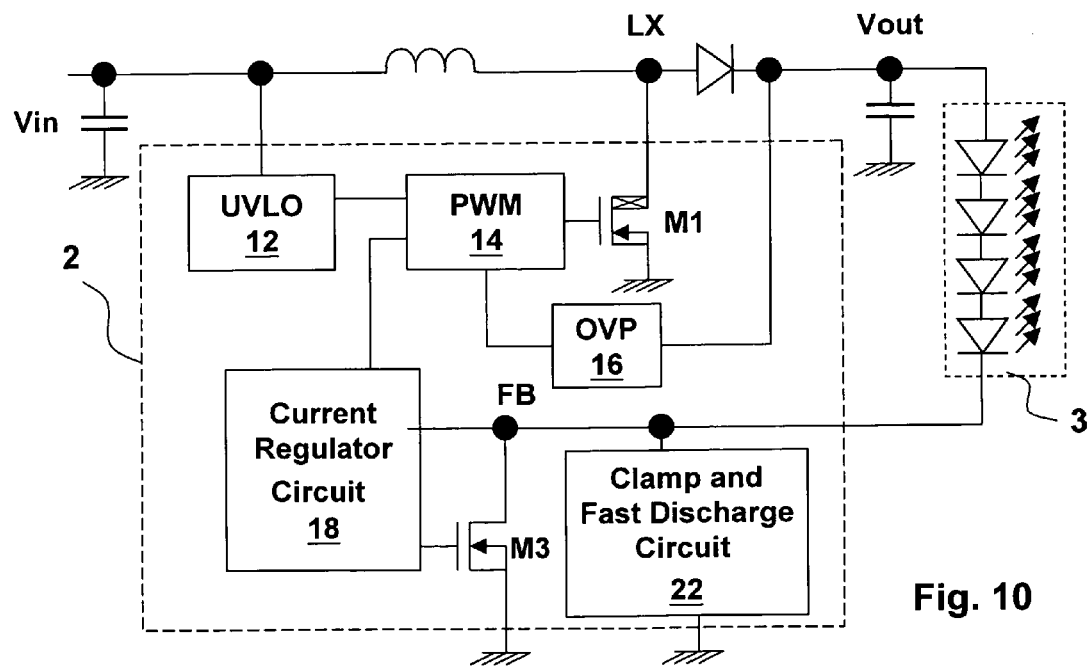
Fig. 10

US 7,994,728 B2

BOOST DRIVER CIRCUIT WITH FAST DISCHARGING FUNCTION

BACKGROUND OF THE INVENTION

1. Field of Invention

The present invention relates to a boost driver circuit with fast discharging function. Particularly, the present invention discloses a boost driver circuit using less number of high voltage transistors; the driver circuit for example can be used as a driver circuit for Light Emitting Diode (LED).

2. Description of Related Art

One application of a boost converter is to drive LEDs. Referring to FIG. 1, the LEDs connected in series require a relatively high voltage, and thus it requires to convert a lower input voltage Vin to a higher output voltage Vout for the LEDs. The conventional LED driver circuit 1 as shown comprises a pulse width modulation (PWM) driver circuit 14, whose output signal controls a power transistor M1. The power transistor M1 switches to convert the input voltage to the output voltage. The LED driver circuit 1 usually further comprises an under voltage lock-out (UVLO) circuit 12 and an over voltage protection (OVP) circuit 16 for overriding the operation of the PWM circuit 14 when the input voltage is lower than a threshold value or the output voltage higher than a threshold value to avoid circuit damages. Moreover, the LED driver circuit 1 further comprises a current regulator circuit 18 cooperating with a corresponding transistor M2 to regulate the current passing through the LED.

In the foregoing circuit, the transistor M1 must be a high voltage transistor because it faces the high voltage at the node LX. In addition, the transistor M2 must be a high voltage transistor as well, because at the instant when the power of the LED driver circuit 1 is turned off, the feedback node FB will be instantly pulled up to the output voltage Vout; therefore, the drain of the transistor M2 should be durable for high voltage, to absorb a large amount of sudden current and conduct the charges to ground. However, the high voltage transistor costs a substantial circuit area, causing difficulties for layout; thus, the conventional circuit is not ideal.

Accordingly, the present invention provides an LED driver circuit with fast discharging function which uses less number of high voltage transistors to overcome the drawbacks of the foregoing prior art.

SUMMARY OF THE INVENTION

An objective of the present invention is to provide a boost driver circuit with fast discharging function.

In order to achieve the foregoing objective, the present invention provides a boost driver circuit with fast discharging function, which converts an input voltage to an output voltage and supplies it to a load, the boost driver circuit comprising: a power transistor electrically connected with a node between an input voltage and an output voltage; a pulse width modulation (PWM) driver circuit for controlling the operation of the power transistor; an output node electrically connected with the output voltage; a feedback node electrically connected with the load; a low voltage transistor electrically connected with the feedback node; and a clamp and fast discharge circuit electrically connected with the feedback node for discharging the feedback node when the voltage at the feedback node is higher than a predetermined voltage.

The clamp and fast discharge circuit of the foregoing boost driver circuit can be further electrically connected with an output node for discharging the output node when the voltage at the feedback node is higher than the predetermined voltage.

The clamp and fast discharge circuit may be made of a silicon-controlled rectifier (SCR).

When the clamp and fast discharge circuit is electrically connected with the output node, the clamp and fast discharge circuit may comprise a current mirror, providing a current path from the output node via the current mirror to ground.

The objectives, technical details, features, and effects of the present invention will be better understood with regard to the detailed description of the embodiments below, with reference to the drawings.

BRIEF DESCRIPTION OF THE DRAWINGS

FIG. 3 shows an embodiment of a clamp and fast discharge circuit.

FIG. 4 and FIG. 5 show two embodiments of an SCR circuit.

FIG. 6 shows a voltage-current characteristic curve of the SCR circuit.

FIGS. 7-9 show three embodiments of the clamp and fast discharge circuit.

FIG. 10 shows another embodiment of the boost driver circuit of the present invention.

DESCRIPTION OF THE PREFERRED EMBODIMENTS

Figure 1:
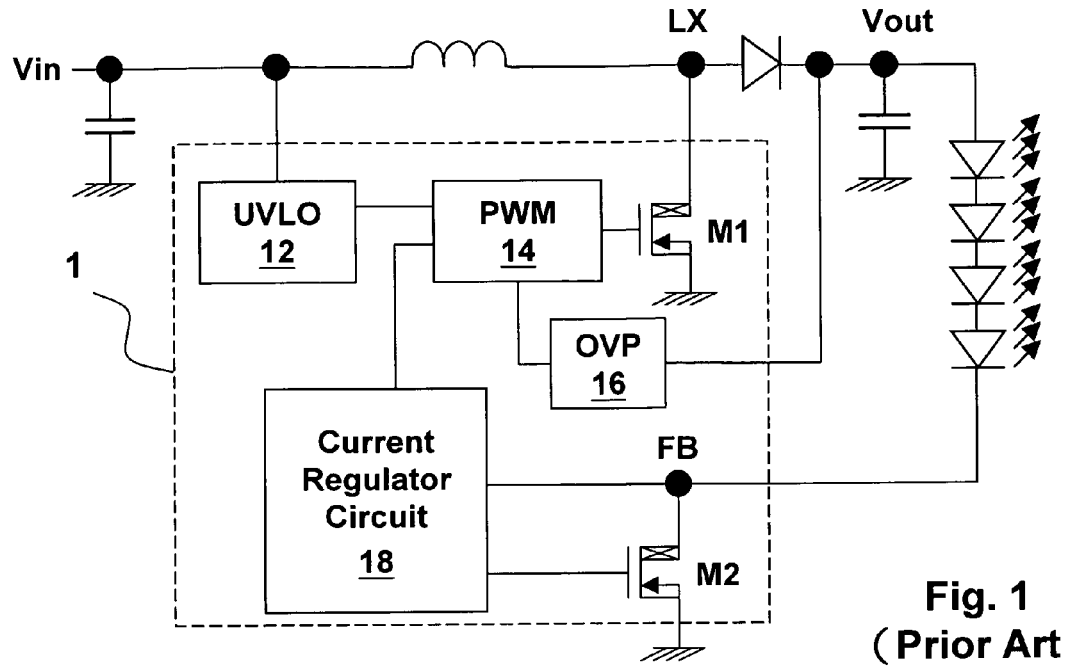
FIG. 1 shows a circuit structure of a conventional LED boost driver circuit.
Figure 2:
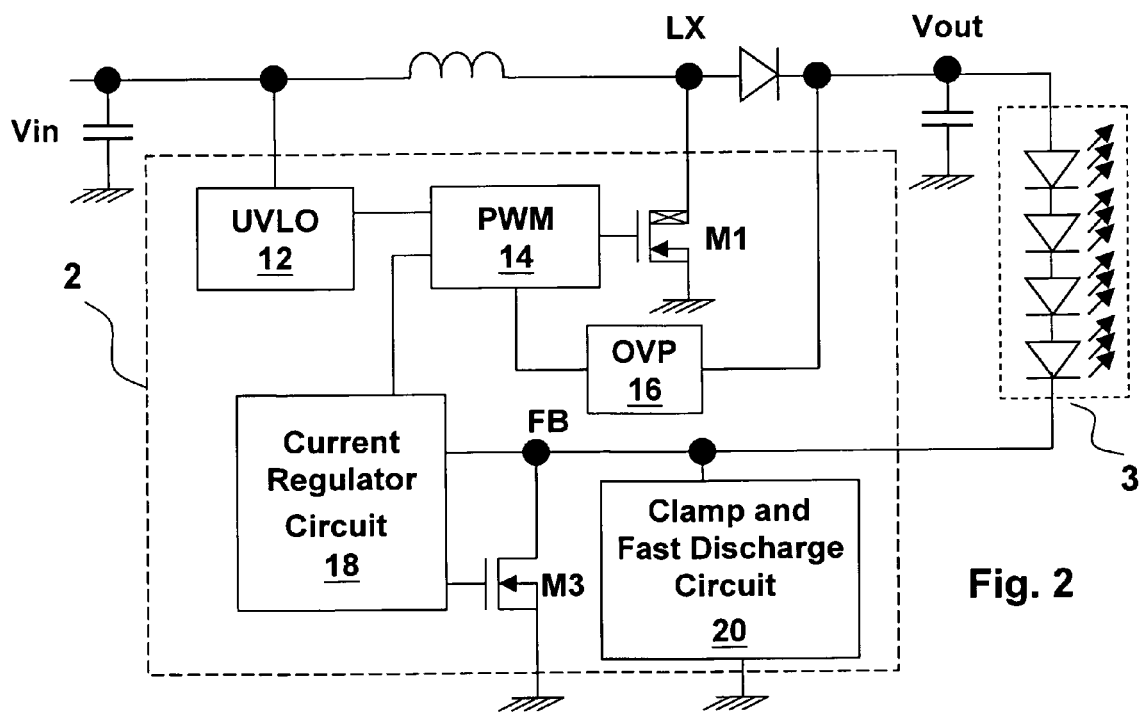
FIG. 2 shows an embodiment of the boost driver circuit of the present invention.

Referring to FIG. 2, in the boost driver circuit 2 of the present invention, a low voltage transistor M3 is used instead of the high voltage transistor M2, and the boost driver circuit 2 further includes a clamp and fast discharge circuit 20 which provides both clamping and fast discharging functions. The clamping function of the clamp and fast discharge circuit 20 limits the voltage at the feedback node FB within a safe range and also provides a fast discharging function to conduct a large amount of current to ground. Accordingly, it solves the layout problem due to high voltage transistor, and also solves the discharging problem of the node FB as well.

The load 3 of the boost driver circuit 2 for example can be an LED circuit as shown, but also can be other forms of loads.

In one preferred embodiment, the clamp and fast discharge circuit 20 can be made of a silicon-controlled rectifier (SCR) as shown in FIG. 3. The SCR circuit 24 can be embodied in many forms, such as the ones shown in FIG. 4 and FIG. 5. FIG. 6 shows the voltage-current characteristic cure of the SCR circuit. As shown in the figure, a snap back occurs after the voltage reaches a threshold voltage Vth; the voltage drops quickly and the current increases drastically with a high slope, thus conducting a large amount of current. Referring in conjunction to FIG. 2 and FIG. 3, if the SCR circuit 24 is used as the clamp and fast discharge circuit 20, electrically connected between the feedback node FB and the ground potential, the clamp and fast discharge circuit 20 made of the SCR circuit can absorb large current quickly to protect the low voltage transistor M3 from being damaged when the feedback node FB is pulled up to high voltage.

FIG. 10 shows another embodiment of the present invention. In this embodiment, the clamp and fast discharge circuit 22 is further electrically connected to the output voltage Vout for quickly discharging the output node (for example, at the instant when the boost driver circuit is turned off as described above), so as to quickly release the charges accumulated thereat; because one additional current path is provided, the low voltage transistor M3 is less required to face the high voltage environment. FIGS. 7-9 illustrate three embodiments of the clamp and fast discharge circuit 22. Referring first to FIG. 7, the SCR circuit 24 is electrically connected to a base of a Bipolar Junction Transistor (BJT) B1; the charges accumulated at the output Vout are thus quickly released by the current amplifying effect of the BJT B1, so that the feedback node FB is not the only discharging node, and the loading of the low voltage transistor M3 is further reduced.

FIG. 8 shows another embodiment in which the BJTs B1 and B2 constitute a current mirror. The current ratio between the two paths follows the matching condition between the transistors B1 and B2. Thus, for example, it can be designed in a way that a larger current flows through the path: output voltage Vout—transistor B1—ground, so that the charges at the output Vout are released through this path to reduce the loading of the low voltage transistor M3.

FIG. 9 shows another embodiment which also includes a current mirror formed by a pair of BJTs B1 and B2. Similarly, the current ratio between the two paths can be decided by the matching condition between the transistor B1 and B2. However, in this embodiment the SCR circuit is replaced by a diode D. (The figure shows only one diode, yet more than one diode can be connected in series if required). The clamp and fast discharge circuit 22 does not operate when the voltage of the feedback node FB is within a normal operation range; but when the voltage of the feedback node FB jumps high, the diode D reversely breaks down, generating a current from the feedback node FB via the transistor B2 to ground. This current is replicated by certain magnitude in the path from the output voltage Vout via the transistor B1 to ground; therefore, it can achieve a similar effect to that of the embodiment disclosed in FIG. 8.

Notably, in each of the embodiments, the current path from the output voltage Vout via the transistor B1 to ground is automatically cut off when the voltage of the feedback node FB drops from high voltage to the normal operation range; in other words, there is no current leakage or power consumption within the normal operation range.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the present invention can be applied in any boost circuits and is not limited to the LED driver circuits. In view of the foregoing, the spirit of the present invention should cover all such and other modifications and variations, which should be interpreted to fall within the scope of the following claims and their equivalents.

What is claimed is:

1. A boost driver circuit with fast discharging function which converts an input voltage to an output voltage and supplies it to a load, the boost driver circuit comprising:
   a power transistor electrically connected with a node between the input voltage and the output voltage;
   a pulse width modulation driver circuit for controlling the operation of the power transistor;
   an output node electrically connected with the output voltage;
   a feedback node electrically connected with the load;
   a low voltage transistor electrically connected with the feedback node; and
   a clamp and fast discharge circuit electrically connected with the feedback node for discharging the feedback node when a voltage at the feedback node is higher than a predetermined voltage.

2. The boost driver circuit of claim 1, wherein the clamp and fast discharge circuit includes a silicon-controlled rectifier (SCR) circuit having one terminal connected to the feedback node, and another terminal connected with a ground potential.

3. The boost driver circuit of claim 2, wherein the predetermined voltage is a snap-back threshold voltage of the SCR circuit.

4. The boost driver circuit of claim 1, wherein the clamp and fast discharge circuit is further electrically connected to an output node for discharging the output node when the voltage at the feedback node is higher than the predetermined voltage.

5. The boost driver circuit of claim 4, wherein the clamp and fast discharge circuit includes:
   an SCR circuit having one terminal electrically connected to the feedback node, and another terminal electrically connected with the ground potential; and
   a bipolar junction transistor (BJT) having a base electrically connected to the SCR circuit, a collector electrically connected to the output node, and an emitter electrically connected to the ground potential.

6. The boost driver circuit of claim 4, wherein the clamp and fast discharge circuit includes:
   a SCR circuit having one terminal electrically connected to the feedback node; and
   a current mirror formed by BJTs, electrically connected to the SCR circuit, the output node, and the ground potential, providing a current path from the output node via the current mirror to the ground potential and replicating a current passing through the SCR circuit in a magnitude to the current path.

7. The boost driver circuit of claim 4, wherein the clamp and fast discharge circuit includes:
   a diode having a cathode electrically connected to the feedback node; and
   a current mirror formed by BJTs, electrically connected with an anode of the diode, the output node, and the ground potential, providing a current path from the output node via the current mirror to the ground and replicating a current passing through the diode in a magnitude to the current path.

8. The boost driver circuit of claim 7, wherein the predetermined voltage is a breakdown voltage of the diode.

9. The boost driver circuit of claim 1, wherein the load includes a Light Emitting Diode (LED).

* * * * *